US012728304B2

(12) United States Patent
Luo et al.

(10) Patent No.: US 12,728,304 B2
(45) Date of Patent: Sep. 8, 2026

(54) IMMERSION VALVE ASSEMBLY AND IMMERSION-TYPE SECONDARY BATTERY DEVICE WITH THE SAME

(71) Applicant: Cornex New Energy Co., Ltd., Wuhan (CN)

(72) Inventors: Yi Luo, Wuhan (CN); Yuanfu Jiang, Wuhan (CN); Haiming Sun, Wuhan (CN)

(73) Assignee: Cornex New Energy CO., LTD., Wuhan (CN)

( * ) Notice: Subject to any disclaimer, the term of this patent is extended or adjusted under 35 U.S.C. 154(b) by 483 days.

(21) Appl. No.: 18/348,126

(22) Filed: Jul. 6, 2023

(65) Prior Publication Data

US 2025/0001225 A1 Jan. 2, 2025

(30) Foreign Application Priority Data

Jun. 27, 2023 (CN) ......................... 202310766924.1

(51) Int. Cl.
*A62C 3/16* (2006.01)
*A62C 31/28* (2006.01)
(Continued)

(52) U.S. Cl.
CPC ................ *A62C 3/16* (2013.01); *A62C 31/28* (2013.01); *A62C 35/13* (2013.01); *H01M 50/383* (2021.01)

(58) Field of Classification Search
CPC ............. H01M 50/317; H01M 50/333; H01M 50/383; A62C 3/16
(Continued)

(56) References Cited

U.S. PATENT DOCUMENTS 8,277,965 B2 * 10/2012 Hermann ............ H01M 10/653 429/185
11,616,270 B2 * 3/2023 Yang .................. H01M 50/383 429/82
2023/0125313 A1 * 4/2023 Liang ................. H01M 50/627 429/53

FOREIGN PATENT DOCUMENTS

CN 207474524 U 6/2018
CN 109585715 A 4/2019
(Continued)

OTHER PUBLICATIONS

Office Action for corresponding JP application No. 2023-177456, mailed Apr. 1, 2025 (English and Japanese language translations) (4 pages).

(Continued)

*Primary Examiner* — Tuongminh N Pham
*Assistant Examiner* — Andrew Domenic Ondrejcak
(74) *Attorney, Agent, or Firm* — Maginot, Moore & Beck, LLP

(57) ABSTRACT

The present disclosure discloses an immersion valve assembly and an immersion-type secondary battery device with the same. The immersion valve assembly includes a fire-fighting liquid storage chamber including a fire-fighting liquid outlet facing a battery cell module; and an immersion valve. An opening/closing cooperation relationship is formed between the fire-fighting liquid outlet and the immersion valve, and the immersion valve is configured to move under the action of a gas pressure and open the fire-fighting liquid outlet when thermal runaway occurs to the battery cell module. The immersion-type secondary battery device includes a box cover, a box body, a battery core module and an immersion valve assembly that is arranged inside the box cover.

15 Claims, 3 Drawing Sheets

(51) Int. Cl.
*A62C 35/13* (2006.01)
*H01M 50/383* (2021.01)

(58) Field of Classification Search
USPC ........................................................ 169/65
See application file for complete search history.

(56) References Cited

FOREIGN PATENT DOCUMENTS

| | | | | |
|---|---|---|---|---|
| CN | 215537954 | U | 1/2022 | |
| CN | 114497842 | A | 5/2022 | |
| CN | 114678639 | A | 6/2022 | |
| EP | 3940860 | A1 * | 1/2022 | ........ H01M 10/6566 |
| JP | 2000274539 | A | 10/2000 | |
| JP | 2008293700 | A | 12/2008 | |
| JP | 2014229523 | A | 12/2014 | |
| JP | 6057961 | B2 | 1/2017 | |
| WO | 2022064856 | A1 | 3/2022 | |
| WO | WO-2022043621 | A1 * | 3/2022 | ........... F16K 17/196 |

OTHER PUBLICATIONS

Office Action for corresponding JP application 2023177456, mailed Sep. 17, 2024 (English and Japanese translations) (5 pages).
Office Action for corresponding AU application 2023233217, mailed Nov. 21, 2024 (7 pages).
Search Report for corresponding EP application 23183621.4, mailed Dec. 11, 2023, 8 pages.

* cited by examiner

IMMERSION VALVE ASSEMBLY AND IMMERSION-TYPE SECONDARY BATTERY DEVICE WITH THE SAME

CROSS-REFERENCE TO RELATED APPLICATION

This application is based on and claims priority to Chinese Patent Application No. 202310766924.1 filed on Jun. 27, 2023, the entire content of which is incorporated herein by reference for all purposes.

FIELD

The present disclosure relates to the field of thermal runaway of batteries, and more particularly, to an immersion valve assembly and an immersion-type secondary battery device with the same.

BACKGROUND

In recent years, with the large-scale development of renewable energy such as wind power and photovoltaic energy, renewable energy is increasingly applied to the power grid, and the improvement of energy storage becomes an important support for maintaining the security and stability of power systems. With the continuous growth of the electrochemical energy storage industry, many fire accidents are caused by energy storage batteries.

SUMMARY

An immersion valve assembly according to an aspect of the present disclosure includes a fire-fighting liquid storage chamber including a fire-fighting liquid outlet facing a battery cell module; and an immersion valve. An opening/closing cooperation relationship is formed between the fire-fighting liquid outlet and the immersion valve, and the immersion valve is configured to move under the action of a gas pressure and open the fire-fighting liquid outlet when thermal runaway occurs to the battery cell module.

An immersion-type secondary battery device according to another aspect of the present disclosure includes a box cover, a box body, a battery cell module and an immersion valve assembly. The immersion valve assembly is arranged inside the box cover. The immersion valve assembly includes a fire-fighting liquid storage chamber including a fire-fighting liquid outlet facing a battery cell module; and an immersion valve. An opening/closing cooperation relationship is formed between the fire-fighting liquid outlet and the immersion valve, and the immersion valve is configured to move under the action of a gas pressure and open the fire-fighting liquid outlet when thermal runaway occurs to the battery cell module.

Figure 1:
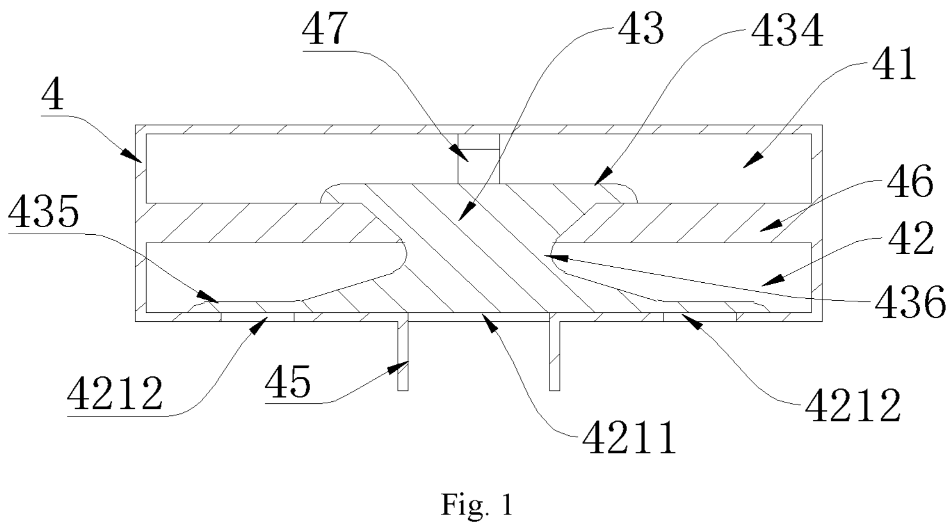
FIG. 1 is a sectional view of an immersion valve assembly according to the present disclosure.

REFERENCE NUMERALS box cover 1; box body 2; battery cell module 3; single battery cell 31; top cover 311; explosion-proof valve 312; immersion valve assembly 4; fire-fighting liquid storage chamber 41; fire-fighting liquid outlet 411; gas exhaust chamber 42; gas inlet 421; air gas exhaust passage 4211, fire-fighting liquid passage 4212; gas exhaust outlet 422; immersion valve 43; upper sealing plate 434; lower sealing plate 435; inwardly recessed surface 436; first inclined surface 4316; second inclined surface 4326; first groove 437; second groove 438; waterproof structure 45; partition plate 46; stop device 47.

DETAILED DESCRIPTION

In order to enable those skilled in the art to better understand technical solutions of the present disclosure, some embodiments of the present disclosure will be described below in combination with specific examples. However, it should be understood that the accompanying drawings are only for description and cannot be construed as limitation on the present disclosure. In order to better illustrate the embodiments, some parts in the drawings will be omitted, enlarged or reduced, which does not represent an actual size of the product. It is understandable for those skilled in the art that some well-known structures in the drawings and their descriptions may be omitted. The positional relationship in the drawings is only for description and cannot be construed to limit the present disclosure.

At present, most of fire-fighting methods and devices for a battery box are realized by connecting a fire-fighting inhibitor storage tank to the battery box and transporting a fire-fighting inhibitor into the battery box through a fire-fighting agent delivery pipeline and a nozzle. For example, in an automatic fire-fighting method and system for an energy storage system described in patent document CN 202210706726.1, a fire-fighting pipeline is connected to a nozzle extending into a housing on a battery rack; it is judged whether thermal runaway occurs to any energy storage unit based on monitoring data from temperature and smoke detectors of each energy storage unit; and when the thermal runaway occurs in any energy storage unit, a flow nozzle control meter is controlled and a corresponding nozzle performs automatic fire fighting on the energy storage unit with the thermal runaway. However, there are the following drawbacks. 1) In case of thermal runaway of the battery, the nozzle can only be triggered after a series of reactions and operations of the temperature detector, smoke detector, control terminal and flow control meter, which is delayed and insensitive. 2) If the temperature detector and smoke detector fail, the nozzle cannot be started, posing potential safety risks. 3) Long fire-fighting pipelines cause the inhibitor to take some time to reach a designated nozzle, which leads to further delay and affects fire-fighting efficiency and spread control of thermal runaway. Therefore, in electrochemical energy storage equipment, how to timely and effectively curb the thermal runaway of the battery at an initial stage is an urgent problem to be solved.

Accordingly, the present disclosure is intended to provide an immersion valve assembly and an immersion-type secondary battery device having the same, directed at the above technical problems.

Figure 2:
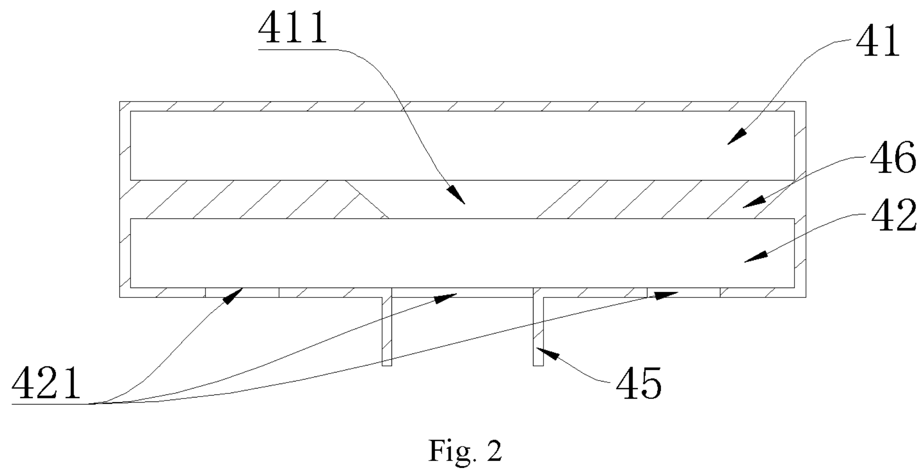
FIG. 2 is a sectional view of the immersion valve assembly of FIG. 1, with an immersion valve removed.
Figure 3:
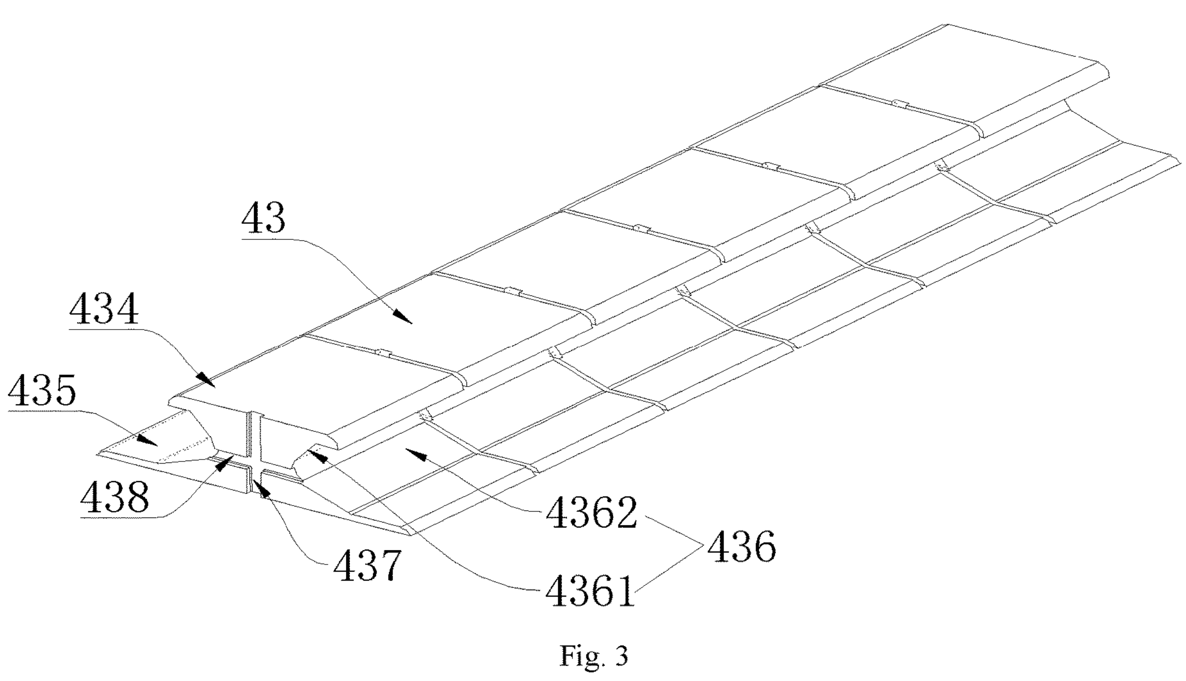
FIG. 3 is a perspective view of an immersion valve according to the present disclosure.

Referring to FIGS. 1-3, the present disclosure provides an immersion valve assembly. The immersion valve assembly includes a fire-fighting liquid storage chamber 41 and an immersion valve 43. The fire-fighting liquid storage chamber 41 is provided with a fire-fighting liquid outlet 411 facing a battery cell module 3. An opening/closing cooperation relationship is formed between the fire-fighting liquid outlet 411 and the immersion valve 43. The immersion valve 43 is configured to move under the action of a gas pressure and open the fire-fighting liquid outlet 411 when thermal runaway occurs to the battery cell module 3.

According to the above structural design, in the present disclosure, with the orientation of the fire-fighting liquid outlet and the arrangement of the immersion valve on the fire-fighting liquid outlet, in which the immersion valve is movable under the action of the gas pressure, the movement of the immersion valve can open the fire-fighting liquid outlet, realizing precise immersion of the battery cell module.

Referring to FIGS. 1-2, in an embodiment, the immersion valve assembly includes a fire-fighting liquid storage chamber 41, an immersion valve 43, and a gas exhaust chamber 42. An opening/closing cooperation relationship is formed between a gas inlet 421 of the gas exhaust chamber 42 and the immersion valve 43. The immersion valve 43 is configured to move under the action of the gas pressure and open the gas inlet 421 when thermal runaway occurs to the battery cell module 3.

According to the above structural design, in this embodiment, on the basis of the fire-fighting liquid storage chamber 41, through the arrangement of the gas exhaust chamber 42 and the cooperation relationship between the gas inlet 421 and the immersion valve 43, the movement of the immersion valve assembly can be realized through gas produced by thermal runaway, and the fire-fighting liquid storage chamber 41 and the gas exhaust chamber 42 can be jointly opened.

Further, the gas exhaust chamber 42 is arranged at a side of the fire-fighting liquid storage chamber 41 adjacent to the battery cell module 3, and an orientation of the gas inlet 421 is the same as the orientation of the fire-fighting liquid outlet 411. Specifically, the gas exhaust chamber 42 is below the fire-fighting liquid storage chamber 41, and both the gas inlet 421 and the fire-fighting liquid outlet 411 face downwards and are aligned with a top cover of the battery cell module.

Referring to FIGS. 1-2, in an embodiment, the gas inlet 421 includes a gas exhaust passage 4211 and a fire-fighting liquid passage 4212 on each of both sides of the gas exhaust passage 4211, and the gas exhaust passage 4211 is above an explosion-proof valve 312 of the battery cell module 3.

According to the above structural design, when the thermal runaway occurs to the battery and gas exhaust is needed, three passages are opened at the same time. The gas exhaust passage 4211 is located right above the explosion-proof valve 312 and is in a constant exhaust state. Two fire-fighting liquid passages 4212 can assist the gas exhaust passage 4211 to exhaust gas to the gas exhaust chamber 42 together, thus increasing an exhaust volume. In addition, since the two fire-fighting liquid passages 4212 are less affected by a high-temperature gas, a fire-fighting liquid can flow along a wall of the immersion valve 43 and the fire-fighting liquid passages 4212 to a battery cell located below to delay the thermal runaway.

Further, a waterproof structure 45 is arranged between the gas exhaust passage 4211 and each of the fire-fighting liquid passages 4212. The waterproof structure 45 may adopt a vertically arranged waterproof board. Due to the existence of the waterproof structure 45, the fire-fighting liquid will not flow to the gas exhaust passage 4211, preventing the fire-fighting liquid from blocking the gas exhaust passage 4211 during a downward immersion process, and not affecting an exhaust effect of the gas exhaust passage 4211.

Referring to FIGS. 1-2, in an embodiment, a partition plate 46 is arranged between the fire-fighting liquid storage chamber 41 and the gas exhaust chamber 42. The immersion valve 43 penetrates the partition plate 46; an upper part of the immersion valve 43 extends outwards and forms an upper sealing plate 434, which realizes a seal between the upper sealing plate 434 and the fire-fighting liquid outlet 411; and a lower part of the immersion valve 43 extends outwards and forms a lower sealing plate 435, which realizes a seal between the lower sealing plate 435 and the gas inlet 421. Specifically, the seal is realized between the lower sealing plate 435 and the gas inlet 421 by a sealant. When meeting the high-temperature gas, the sealant will melt, and the immersion valve 43 will move up under the pressure of the high-temperature gas and then open the gas inlet 421.

According to the above structural design, the seal between the immersion valve 43 and the fire-fighting liquid outlet 411 and the seal between the immersion valve 43 and the gas inlet 421 can be better realized by the upper sealing plate 434 and the lower sealing plate 435.

Referring to FIG. 3, in an embodiment, each of two opposite sides of the immersion valve 43 is configured as an inwardly recessed surface 436, and the inwardly recessed surface 436 includes a first inclined surface 4361 and a second inclined surface 4362. The first inclined surface 4361 is configured to abut against or separate from the partition plate 46, and the second inclined surface 4362 is configured to guide the fire-fighting liquid to flow to the fire-fighting liquid passage 4212.

According to the above structural design, when the immersion valve 43 moves up, there is a gap between the first inclined surface 4361 and the partition plate 46, and the fire-fighting liquid can flow along the second inclined surface 4362 down to the lower sealing plate 435, and from an outer edge of the lower sealing plate 435 to the fire-fighting liquid passage 4212, so as to extinguish fire of the battery cell located below.

Referring to FIG. 3, in an embodiment, an end face of the immersion valve 43 includes a first groove 437 and a second groove 438 crossing each other. The first groove 437 is configured to connect the fire-fighting liquid storage chamber 41 with the gas exhaust chamber 42, and the second groove 438 is configured to connect the gas exhaust chamber 42 on both sides of the immersion valve 43. Both the first groove 437 and the second groove 438 are arranged to avoid the gas inlet 421.

According to the above structural design, the gas pressure balance between a battery cavity and an immersion cavity can be ensured, and the gas can enter the fire-fighting liquid storage chamber 41 and the gas exhaust chamber 42, which is conducive to smooth flow of the fire-fighting liquid.

Further, a stop device 47 is arranged at a top of the immersion valve 43 and is configured to limit a maximum displacement of the immersion valve 43 after the immersion valve is lifted. The stop device 47 may be a tension spring or a mechanical device and be embedded in the top of the immersion valve 43.

Referring to FIG. 3, in an embodiment, the immersion valve assembly 4 includes a plurality of segmented immersion valves 43 arranged in an array, and the immersion valves 43 are arranged in one-to-one correspondence with single battery cells 31 in the battery cell module 3.

According to the above structural design, the immersion valves 43 are aligned with the single battery cells 31, so that the battery cells can be immersed independently and precisely, and timely response can be made when the explosion-proof valve 312 of the battery starts to produce gas and before flame appears, further improving an immersion effect when the thermal runaway occurs to the battery.

Based on the structural designs of the immersion valve assembly, the present disclosure also proposes an immersion-type secondary battery device.

Figure 4:
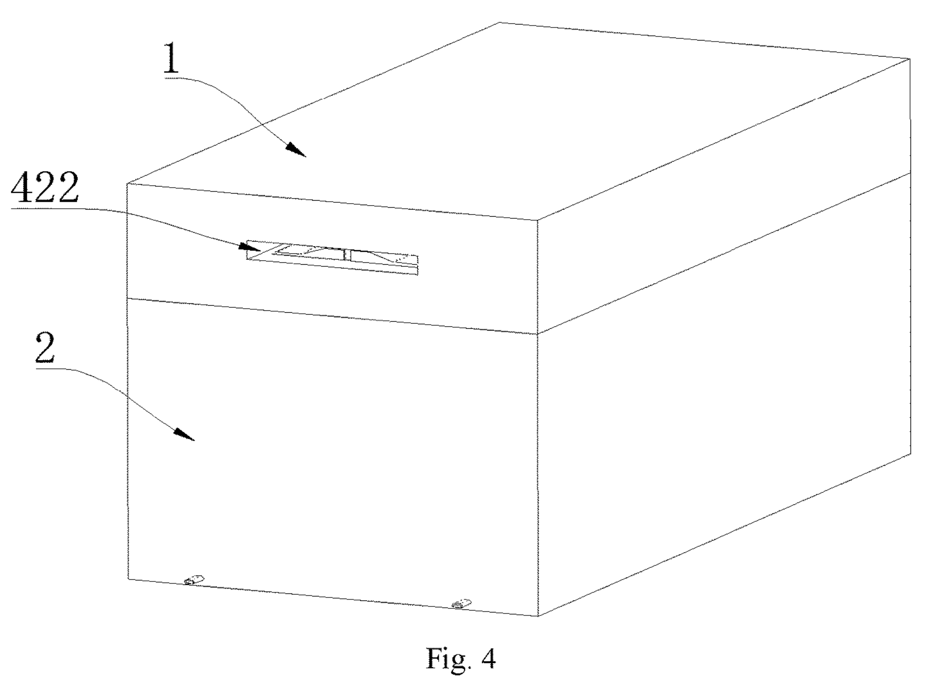
FIG. 4 is a perspective view of an immersion-type secondary battery device according to the present disclosure.
Figure 5:
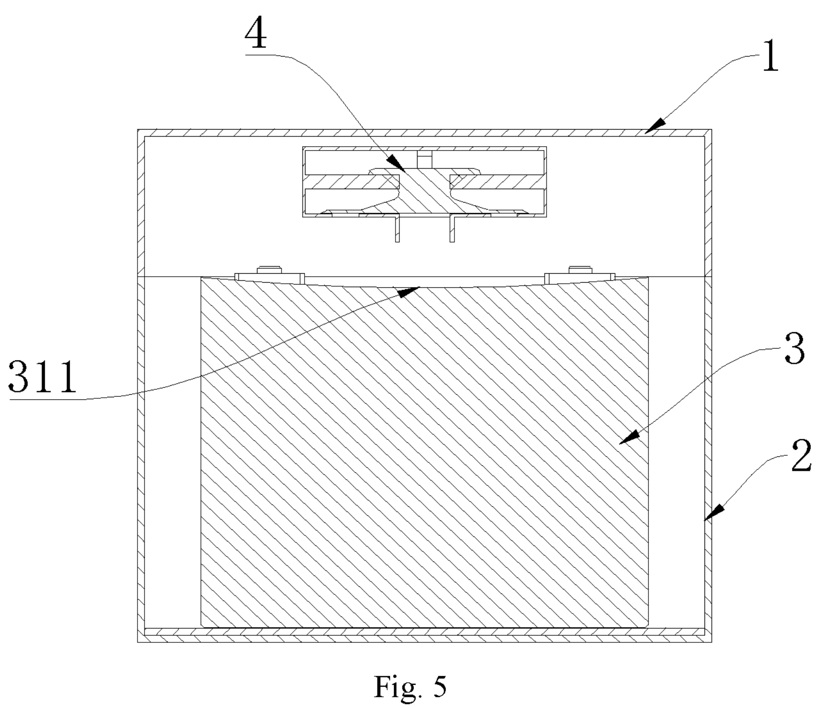
FIG. 5 is a sectional view of an immersion-type secondary battery device according to the present disclosure.

Referring to FIGS. 4-5, in an embodiment, the immersion-type secondary battery device includes a box cover 1, a box body 2, the battery cell module 3 and the immersion valve assembly 4. The immersion valve assembly 4 is arranged inside the box cover 1.

According to the above structural design, the fire-fighting liquid storage chamber 41 and the gas exhaust chamber 42 are integrated in the box cover 1, so that the immersion valve assembly 4 does not occupy an accommodation space for the battery cell module located below, and the energy density of the battery can be improved. When thermal runaway occurs, the high-temperature exhaust gas can be discharged and the immersion valve 43 can be triggered by the high-temperature gas, which enhances the detection sensitivity and robustness of the immersion device.

Figure 6:
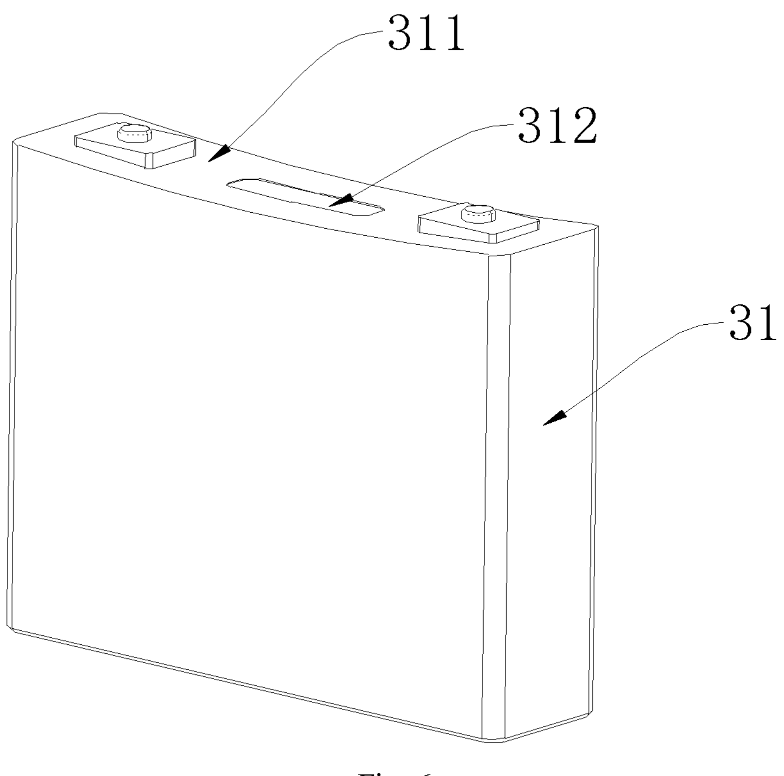
FIG. 6 is a perspective view of a single battery cell according to the present disclosure.

Referring to FIG. 6, in an embodiment, a top cover 311 in the battery cell module 3 adopts an arc-shaped design, and a region, where the explosion-proof valve 312 is, in the middle of the top cover 311 is configured as the lowest point.

According to the above structural design, the fire-fighting liquid after immersion can accumulate in the region, where the explosion-proof valve 312 is, of the top cover, so that the fire-fighting liquid can enter the battery first, and a suppression effect on thermal runaway can be improved.

Based on the above structural design, a working principle of the immersion valve assembly according to the present disclosure is as follows.

When the thermal runaway occurs to the battery, the high-temperature gas will be ejected from the explosion-proof valve 312 of the battery. The gas exhaust passage 4211 right above the battery in the thermal runaway is on the same axis as the explosion-proof valve 312 of the battery. The high-temperature gas melts the sealant between the immersion valve 43 and the gas exhaust chamber 42, and at the same time, the high pressure in the battery cavity pushes the immersion valve 43 upwards, opening the fire-fighting liquid outlet 411 and the gas inlet 421. The high-temperature gas enters the gas exhaust chamber 42 through the gas exhaust passage 4211 and the fire-fighting liquid passage 4212, and then is discharged out of the device. The fire-fighting liquid flows down to the fire-fighting liquid passage 4212 along the inwardly recessed surface 436 of the immersion valve 43, and falls onto the top cover 311 located below. The fire-fighting liquid converges to the middle region, where the explosion-proof valve 312 is, along an arc shape of the top cover 311, and enters the battery through the explosion-proof valve 312, to curb the thermal runaway.

Materials of the immersion valve 43 may be either 7-series aluminum alloys or 8-series aluminum alloys, since the aluminum alloys are relatively light and have little influence on an opening pressure of the immersion valve. Consequently, only an adhesive force generated by the sealant between the immersion valve 43 and the gas exhaust chamber 42 needs to be considered.

Generally, in case of thermal runaway of the single battery cell 31, an opening pressure of the explosion-proof valve 312 is set as the opening pressure of the immersion valve 43, to ensure that the immersion valve 43 can be opened smoothly under a critical condition.

An objective of the present disclosure is to provide an immersion valve assembly and an immersion-type secondary battery device with the same, to address the drawbacks in the related art. The present disclosure can respond timely when an explosion-proof valve of a battery starts to produce gas and before flame appears, which is sensitive and further improves an immersion effect of the battery when thermal runaway occurs.

In order to achieve the above objective, the present disclosure provides the following technical solutions.

An immersion valve assembly includes a fire-fighting liquid storage chamber including a fire-fighting liquid outlet facing a battery cell module; and an immersion valve. An opening/closing cooperation relationship is formed between the fire-fighting liquid outlet and the immersion valve, and the immersion valve is configured to move under the action of a gas pressure and open the fire-fighting liquid outlet when thermal runaway occurs to the battery cell module.

In some embodiments, the immersion valve assembly further includes a gas exhaust chamber. An opening/closing cooperation relationship is formed between a gas inlet of the gas exhaust chamber and the immersion valve, and the immersion valve is configured to move under the action of the gas pressure and open the gas inlet when the thermal runaway occurs to the battery cell module.

In some embodiments, the gas exhaust chamber is arranged at a side of the fire-fighting liquid storage chamber adjacent to the battery cell module, and an orientation of the gas inlet is the same as an orientation of the fire-fighting liquid outlet.

In some embodiments, the gas inlet includes a gas exhaust passage and a fire-fighting liquid passage on each of both sides of the gas exhaust passage, and the gas exhaust passage is above the explosion-proof valve of the battery cell module.

In some embodiments, a waterproof structure is arranged between the gas exhaust passage and the fire-fighting liquid passage.

In some embodiments, a partition plate is arranged between the fire-fighting liquid storage chamber and the gas exhaust chamber, and the immersion valve penetrates the partition plate; an upper part of the immersion valve extends outwards and forms an upper sealing plate, a seal being formed between the upper sealing plate and the fire-fighting liquid outlet; and a lower part of the immersion valve extends outwards and forms a lower sealing plate, a seal being formed between the lower sealing plate and the gas inlet.

In some embodiments, each of two opposite sides of the immersion valve is configured as an inwardly recessed surface, and the inwardly recessed surface includes a first inclined surface and a second inclined surface; and the first inclined surface is configured to abut against or separate from the partition plate, and the second inclined surface is configured to guide the fire-fighting liquid to flow to the fire-fighting liquid passage.

In some embodiments, an end face of the immersion valve includes a first groove and a second groove crossing each other; the first groove is configured to connect the fire-fighting liquid storage chamber with the gas exhaust chamber, and the second groove is configured to connect the gas exhaust chamber on both sides of the immersion valve; and the first groove and the second groove are configured to avoid the gas inlet.

In some embodiments, the seal between the lower sealing plate and the gas inlet is formed by a sealant.

In some embodiments, a stop device is arranged at a top of the immersion valve and is configured to limit a maximum displacement of the immersion valve after the immersion valve is lifted.

In some embodiments, the immersion valve assembly includes a plurality of segmented immersion valves arranged in an array, the immersion valves being in one-to-one correspondence with single battery cells in the battery cell module.

An immersion-type secondary battery device includes a box cover, a box body, a battery cell module and the immersion valve assembly as described above. The immersion valve assembly is arranged inside the box cover.

In some embodiments, a top cover in the battery cell module is arc-shaped, and a region, where the explosion-proof valve is, in the middle of the top cover is configured as the lowest point.

The present disclosure has the following advantages and beneficial effects compared with the related art.

In the present disclosure, it is not necessary to arrange additional electronic devices (e.g., temperature and smoke detectors). With the linked arrangement of the immersion valve and the fire-fighting liquid storage chamber, the immersion valve can move under the action of the gas pressure and open the fire-fighting liquid storage chamber, when the thermal runaway gas reaches an opening pressure, thereby responding sensitively and curbing the thermal runaway of the battery timely. Meanwhile, the arrangement of the immersion valve also avoids the defect of being unable to start fire extinguishing due to electronic devices being prone to malfunction and failure.

With the linked arrangement of the immersion valve, the fire-fighting liquid storage chamber and the gas exhaust chamber, when the thermal runaway gas reaches the opening pressure, the immersion valve can move under the action of the gas pressure to open the fire-fighting liquid storage chamber and the gas exhaust chamber simultaneously, which can lower an internal pressure and reduce a risk of explosion while immersing the battery. In addition, since the immersion valve is used for dual purposes, the immersion valve assembly has high integration and occupies small space, which has little influence on an accommodation space for the battery cell module and the energy density of the product.

The immersion valve assembly according to the present disclosure adopts segmented immersion valves fixed inside the box cover along a length direction of the secondary battery device. The immersion valve assembly only occupies an internal space of the box cover, and does not affect the accommodation space for the battery cell module and the energy density of the product. Moreover, the segmented immersion valves are in one-to-one correspondence with the single battery cells located below, which can respond timely when the explosion-proof valve of the battery starts to produce gas and before flame appears, and can realize precise immersion, further improving the immersion effect when the thermal runaway occurs to the battery.

In the present disclosure, the gas inlet of the gas exhaust chamber is configured as three passages, i.e., one gas exhaust passage and two fire-fighting liquid passages, and the waterproof structure is arranged between the gas exhaust passage and each of the fire-fighting liquid passages. When the thermal runaway occurs to the battery and gas exhaust is needed, three passages are opened at the same time. The gas exhaust passage is located right above the explosion-proof valve and is in a constant exhaust state. The two fire-fighting liquid passages can assist the gas exhaust passage to exhaust gas to the gas exhaust chamber together, thus increasing an exhaust volume. In addition, since the two fire-fighting liquid passages are less affected by a high-temperature gas, a fire-fighting liquid can flow along a wall of the immersion valve and the fire-fighting liquid passages to the battery cells located below to delay the thermal runaway. Moreover, due to the existence of the waterproof structure, the fire-fighting liquid will not flow to the gas exhaust passage, avoiding affecting an exhaust effect of the gas exhaust passage.

In the present disclosure, since the top cover adopts the arc-shaped design, the fire-fighting liquid after immersion can accumulate in the region, where the explosion-proof valve is, of the top cover, so that the fire-fighting liquid can enter the battery first, and a suppression effect on thermal runaway can be improved.

In the present disclosure, the first groove and the second groove crossing each other on the end face of the immersion valve can ensure the gas pressure balance between a battery cavity and an immersion cavity, and guarantee that the gas can enter the fire-fighting liquid storage chamber and the gas exhaust chamber, which is conducive to smooth flow of the fire-fighting liquid.

Based on the description of the present disclosure and the accompanying drawings, it is easy for those skilled in the art to manufacture or use the immersion-type secondary battery device of the present disclosure, and achieve the beneficial effects recorded in the present disclosure.

In the present disclosure, unless specified otherwise, terms such as “length,” “width,” “up,” “down,” “front,” “rear,” “left,” “right,” “vertical,” “horizontal,” “top,” “bottom,” “inner,” “outer,” “clockwise,” “anticlockwise,” “axial,” “radial,” “peripheral” and the like refer to the orientation or relative position as shown in the drawings. These relative terms are for convenience and simplification of description of the present disclosure and do not indicate or imply that the device or element referred to must have a particular orientation or be constructed and operated in a particular orientation. Hence, these relative terms are only for illustrative purposes and shall not be construed to limit the present disclosure. For those skilled in the art, the specific meanings of the above terms can be understood in combination with the accompany drawings and according to particular situations.

In the present disclosure, unless specified or limited otherwise, terms such as “arranged,” “connected,” “coupled,” and the like are used broadly, and may be, for example, fixed connections, detachable connections, or integral connections; may also be direct connections or indirect connections via intervening structures; may also be inner connection of two elements, which can be understood by those skilled in the art according to specific situations.

Some embodiments of the present disclosure are described above and shall not be construed to limit the present disclosure. All simple modifications and equivalent changes made to the above embodiments fall within the protection scope of the present disclosure.

What is claimed is:

1. An immersion valve assembly, comprising:

a fire-fighting liquid storage chamber, including a fire-fighting liquid outlet configured to face a battery cell module;

an immersion valve, and a gas exhaust chamber;

wherein an opening/closing cooperation relationship is formed between the fire-fighting liquid outlet and the immersion valve, and the immersion valve is configured to move under the action of a gas pressure and open the fire-fighting liquid outlet;

wherein an opening/closing cooperation relationship is formed between a gas inlet of the gas exhaust chamber and the immersion valve, and the immersion valve is configured to move under the action of the gas pressure and open the gas inlet;

wherein a partition plate is arranged between the fire-fighting liquid storage chamber and the gas exhaust chamber, and the immersion valve penetrates the partition plate;

wherein an upper part of the immersion valve extends outwards and forms an upper sealing plate, a seal being formed between the upper sealing plate and the fire-fighting liquid outlet;

wherein a lower part of the immersion valve extends outwards and forms a lower sealing plate, a seal being formed between the lower sealing plate and the gas inlet;

wherein each of two opposite sides of the immersion valve are configured as an inwardly recessed surface, and the inwardly recessed surface includes a first inclined surface and a second inclined surface; and wherein the first inclined surface is configured to abut against or separate from the partition plate, and the second inclined surface is configured to guide fire-fighting liquid to flow to the fire-fighting liquid passage.

2. The immersion valve assembly according to claim 1, wherein the gas exhaust chamber is configured to be arranged at a side of the fire-fighting liquid storage chamber adjacent to the battery cell module, and an orientation of the gas inlet is the same as an orientation of the fire-fighting liquid outlet.

3. The immersion valve assembly according to claim 1, wherein the gas inlet includes a gas exhaust passage and a fire-fighting liquid passage on each of both sides of the gas exhaust passage, and the gas exhaust passage is configured to be located above an explosion-proof valve of the battery cell module.

4. The immersion valve assembly according to claim 3, wherein a waterproof structure is arranged between the gas exhaust passage and the fire-fighting liquid passage.

5. The immersion valve assembly according to claim 1, wherein:

an end face of the immersion valve includes a first groove and a second groove crossing each other;

the first groove is configured to connect the fire-fighting liquid storage chamber with the gas exhaust chamber, and the second groove is configured to connect the gas exhaust chamber on both sides of the immersion valve; and the first groove and the second groove are configured to avoid the gas inlet.

6. The immersion valve assembly according to claim 1, wherein the seal between the lower sealing plate and the gas inlet is formed by a sealant.

7. The immersion valve assembly according to claim 1, wherein a stop device is arranged at a top of the immersion valve and is configured to limit a maximum displacement of the immersion valve after the immersion valve is lifted.

8. The immersion valve assembly according to claim 7, the stop device is a tension spring embedded in the top of the immersion valve.

9. The immersion valve assembly according to claim 1, the immersion valve including a plurality of segmented immersion valves arranged in an array, wherein the plurality of segmented immersion valves are configured to be in one-to-one correspondence with a single battery cell in the battery cell module.

10. The immersion valve assembly according to claim 1, wherein the immersion valve is made of a 7-series aluminum alloy or an 8-series aluminum alloy.

11. An immersion-type secondary battery device, comprising a box cover, a box body, a battery cell module and an immersion valve assembly, wherein the immersion valve assembly is arranged inside the box cover and comprises:

a fire-fighting liquid storage chamber, including a fire-fighting liquid outlet facing a battery cell module;

an immersion valve, and a gas exhaust chamber wherein an opening/closing cooperation relationship is formed between the fire-fighting liquid outlet and the immersion valve, and the immersion valve is configured to move under the action of a gas pressure and open the fire-fighting liquid outlet when thermal runaway occurs to the battery cell module;

wherein an opening/closing cooperation relationship is formed between a gas inlet of the gas exhaust chamber and the immersion valve, and the immersion valve is configured to move under the action of the gas pressure and open the gas inlet when the thermal runaway occurs to the battery cell module;

wherein a partition plate is arranged between the fire-fighting liquid storage chamber and the gas exhaust chamber, and the immersion valve penetrates the partition plate;

wherein an upper part of the immersion valve extends outwards and forms an upper sealing plate, a seal being formed between the upper sealing plate and the fire-fighting liquid outlet;

wherein a lower part of the immersion valve extends outwards and forms a lower sealing plate, a seal being formed between the lower sealing plate and the gas inlet;

wherein each of two opposite sides of the immersion valve are configured as an inwardly recessed surface, and the inwardly recessed surface includes a first inclined surface and a second inclined surface; and wherein the first inclined surface is configured to abut against or separate from the partition plate, and the second inclined surface is configured to guide fire-fighting liquid to flow to the fire-fighting liquid passage.

12. The immersion-type secondary battery device according to claim 11, wherein a top cover in the battery cell module is arc-shaped, and a region, where an explosion-proof valve is in the middle of the top cover and is configured as the lowest point.

13. The immersion-type secondary battery device according to claim 11, wherein the gas exhaust chamber is arranged at a side of the fire-fighting liquid storage chamber adjacent to the battery cell module, and an orientation of the gas inlet is the same as an orientation of the fire-fighting liquid outlet.

14. The immersion-type secondary battery device according to claim 11, wherein the gas inlet includes a gas exhaust passage and a fire-fighting liquid passage on each of both sides of the gas exhaust passage, and the gas exhaust passage is above an explosion-proof valve of the battery cell module.

15. An immersion valve assembly, comprising:

a fire-fighting liquid storage chamber, including a fire-fighting liquid outlet configured to face a battery cell module;

an immersion valve, and a gas exhaust chamber;

wherein an opening/closing cooperation relationship is formed between the fire-fighting liquid outlet and the immersion valve, and the immersion valve is configured to move under the action of a gas pressure and open the fire-fighting liquid outlet;

wherein an opening/closing cooperation relationship is formed between a gas inlet of the gas exhaust chamber and the immersion valve, and the immersion valve is configured to move under the action of the gas pressure and open the gas inlet;

wherein a partition plate is arranged between the fire-fighting liquid storage chamber and the gas exhaust chamber, and the immersion valve penetrates the partition plate;

wherein an upper part of the immersion valve extends outwards and forms an upper sealing plate, a seal being formed between the upper sealing plate and the fire-fighting liquid outlet;

wherein a lower part of the immersion valve extends outwards and forms a lower sealing plate, a seal being formed between the lower sealing plate and the gas inlet;

wherein an end face of the immersion valve includes a first groove and a second groove crossing each other;

wherein the first groove is configured to connect the fire-fighting liquid storage chamber with the gas exhaust chamber, and the second groove is configured to connect the gas exhaust chamber on both sides of the immersion valve; and wherein the first groove and the second groove are configured to avoid the gas inlet.

* * * * *